United States Patent [19]
Sugiyama et al.

[11] Patent Number: 4,482,925
[45] Date of Patent: Nov. 13, 1984

[54] QUICK-MOTION REPRODUCING SYSTEM IN A ROTARY RECORDING MEDIUM REPRODUCING APPARATUS

[75] Inventors: Hiroyuki Sugiyama, Isehara; Ryozo Abe, Yokohama, both of Japan

[73] Assignee: Victor Company of Japan, Ltd., Yokohama, Japan

[21] Appl. No.: 357,294

[22] Filed: Mar. 11, 1982

[30] Foreign Application Priority Data

Mar. 12, 1981 [JP] Japan .................................. 56-35568

[51] Int. Cl.³ .............................................. H04N 5/76
[52] U.S. Cl. ..................................... 358/342; 358/907
[58] Field of Search ............... 358/342, 907, 312, 323; 369/111; 360/10.1

[56] References Cited

U.S. PATENT DOCUMENTS

| | | | |
|---|---|---|---|
| Re. 29,963 | 4/1979 | Janssen . | |
| 3,854,015 | 12/1974 | Janssen | 358/907 |
| 3,973,080 | 8/1976 | Dickopp et al. | 358/907 |
| 3,993,863 | 11/1976 | Leedom et al. | 358/342 |
| 4,331,976 | 5/1982 | Kinjo et al. | 358/342 |
| 4,340,907 | 7/1982 | Hirata et al. | 369/47 |

FOREIGN PATENT DOCUMENTS 2946015 5/1980 Fed. Rep. of Germany .
2487559 7/1981 France .

Primary Examiner—Donald E. McElheny, Jr.
Attorney, Agent, or Firm—Louis Bernat

[57] ABSTRACT

A quick-motion reproducing system is applied to a reproducing apparatus for reproducing a rotary recording medium by a reproducing element. The rotary recording medium is recorded with a video signal on a spiral track, and further recorded with a predetermined reference signal. The predetermined reference signal is recorded within intervals corresponding to vertical synchronizing signals within vertical blanking periods of the recorded video signal, for each track turn of the spiral track. The quick-motion reproducing system comprises a kick pulse generating circuit for generating a kick pulse only within a predetermined shifting interval including the vertical blanking period of the recorded video signal and intervals in the vicinity of this vertical blanking period, and a shifting circuit applied with the generated kick pulse, for successively shifting the reproducing element to adjacent tracks, only within the above predetermined shifting interval.

6 Claims, 5 Drawing Figures

QUICK-MOTION REPRODUCING SYSTEM IN A ROTARY RECORDING MEDIUM REPRODUCING APPARATUS

BACKGROUND OF THE INVENTION

The present invention generally relates to quick-motion reproducing systems in rotary recording medium reproducing apparatuses, and more particularly to a quick-motion reproducing system in a rotary recording medium reproducing apparatus, wherein a reproducing element is always shifted to an adjacent track at a position corresponding to a vertical blanking period of a recording video signal or at a position in the vicinity of the vertical blanking period position.

A new information signal recording and/or reproducing system has been proposed in a U.S. patent application Ser. No. 785,095 entitled "INFORMATION SIGNAL RECORDING SYSTEM" filed Apr. 6, 1977, now U.S. Pat. No. 4,331,976, in which the assignee is the same as that of the present application. According to this proposed system, the recording system forms pits in accordance with the information signal to record the information signal along a spiral track on a flat rotary recording medium (hereinafter simply referred to as a disc), without forming a groove therein. In the reproducing system, a reproducing stylus traces over along this track to reproduce the recorded information signal in response to variations in the electrostatic capacitance formed between the reproducing stylus and the disc.

In this system, since no grooves are provided on the disc for guiding the reproducing stylus, it becomes necessary to record pilot or reference signals on or in the vicinity of a track of the information signal such as a video signal, on the disc. Upon reproduction, the reference signals are reproduced together with the video signal. Tracking control is carried out so that the reproducing stylus accurately traces along the track in response to the reproduced reference signals.

By use of this previously proposed system, there is no possibility whatsoever of the reproducing stylus or the disc being damaged, since the recording track has no groove. The reproducing stylus can trace the same portion of the track repeatedly many times, whereby a special reproduction such as still, slow-motion, or quick-motion reproduction becomes possible.

Thus, in a U.S. patent application Ser. No. 4,813 entitled "SPECIAL REPRODUCING SYSTEM IN AN APPARATUS FOR REPRODUCING VIDEO SIGNALS FROM A ROTARY RECORDING MEDIUM" filed Jan. 19, 1979, now U.S. Pat. No. 4,340,907, in which the assignee in the same as that of the present application, a special reproducing system in a disc reproducing apparatus was proposed which is capable of performing a special reproduction in which a picture having a motion different from that upon normal reproduction is obtained in an excellent manner.

The special reproducing system comprises a reproducing element for tracing the track of the disc and picking up the recorded signal, a tracking control mechanism for operating in response to kick pulses applied thereto to cause the reproducing element to shift to an adjacent track turn of the spiral track, and a kick pulse generating circuit for generating kick pulses with timings corresponding to the vertical blanking period positions of the recorded video signal, where the kick pulses are of a number corresponding to the number of operational modes for carrying out a special reproduction differing from normal reproduction at every rotational period of the disc, and supplying the kick pulses to the tracking control mechanism. The reproducing element is shifted to the adjacent track turn within the vertical blanking period of the recorded video signal, by the tracking control mechanism responsive to the kick pulses.

Accordingly, the noise introduced when the reproducing element moves to an adjacent track does not appear in the picture, and a special reproduction such as still reproduction, slow-motion and quick-motion reproduction in the forward direction, and normal-speed, slow-motion, and quick-motion reproduction in the backward direction, can be performed in which a fine picture is obtained.

In the above disc, a video signal of four fields are normally recorded for one track turn. Hence, the vertical synchronizing signal is recorded at four positions for one track turn. In the above previously proposed system, the maximum number of times the reproducing element is shifted to an adjacent track during one track turn is four. Thus, the maximum quick-motion speed in the above system is quintuple-speed.

If a quick-motion reproduction faster than the quintuple-speed reproduction is to be performed in the above system, the reproducing element must be shifted to an adjacent track at an intermediate part of the video information signal, at positions other than the vertical synchronizing signal position within each field. For example, especially during a high-speed quick-motion reproduction, the reproducing element is mostly shifted at intermediate parts of the video information signal. However, when the reproducing element is shifted at the intermediate parts of the video information signal, noise is introduced in the reproduced picture. This noise increases as the speed (multiplicity number) of the quick-motion reproduction is increased, and the reproduced picture will contain undesirable and noticeable noise.

SUMMARY OF THE INVENTION

Accordingly, it is a general object of the present invention is to provide a novel and useful quick-motion reproducing system in a rotary recording medium reproducing apparatus, in which the above described disadvantages have been overcome.

Another and more specific object of the present invention is to provide a quick-motion reproducing system in a rotary recording medium reproducing apparatus, wherein a reproducing element is always shifted to an adjacent track at a position corresponding to a vertical blanking period of a recording video signal or at a position in the vicinity of the vertical blanking period position. According to the system of the present invention, the noise introduced when the reproducing element is shifted to the adjacent track does not appear in the reproduced picture, or even when the noise is introduced, the noise will appear at upper and lower edges of the reproduced picture where the noise does not stand out. The system according to the present invention is thus capable of obtaining a quick-motion reproduced picture of high quality.

Other objects and further features of the present invention will be apparent from the following detailed description when read in conjunction with the accompanying drawings.

DETAILED DESCRIPTION

Figure 1:
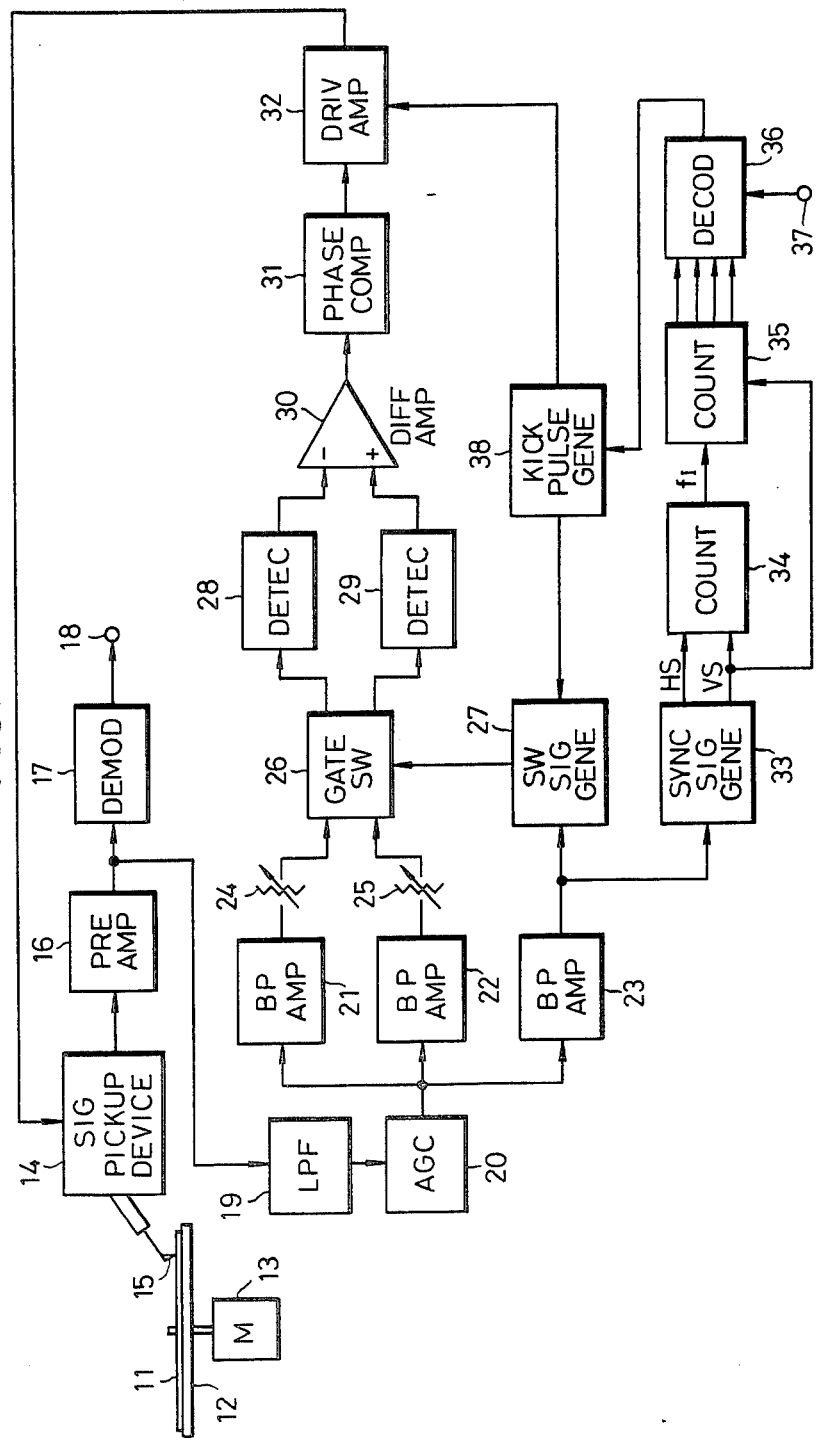
FIG. 1 is a systematic block diagram showing a rotary recording medium reproducing apparatus applied with an embodiment of a quick-motion reproducing system according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and moves continuously and linearly in a direction from the outer peripheral part to the inner peripheral part at a speed equal to the distance of one track pitch per revolution of the turntable 12, during a forward normal reproduction mode. Accordingly, the stylus 15 of the signal pickup device 14 travels radially across the rotating disc 11 and relatively traces the spiral track of the disc 11.

Figure 2:
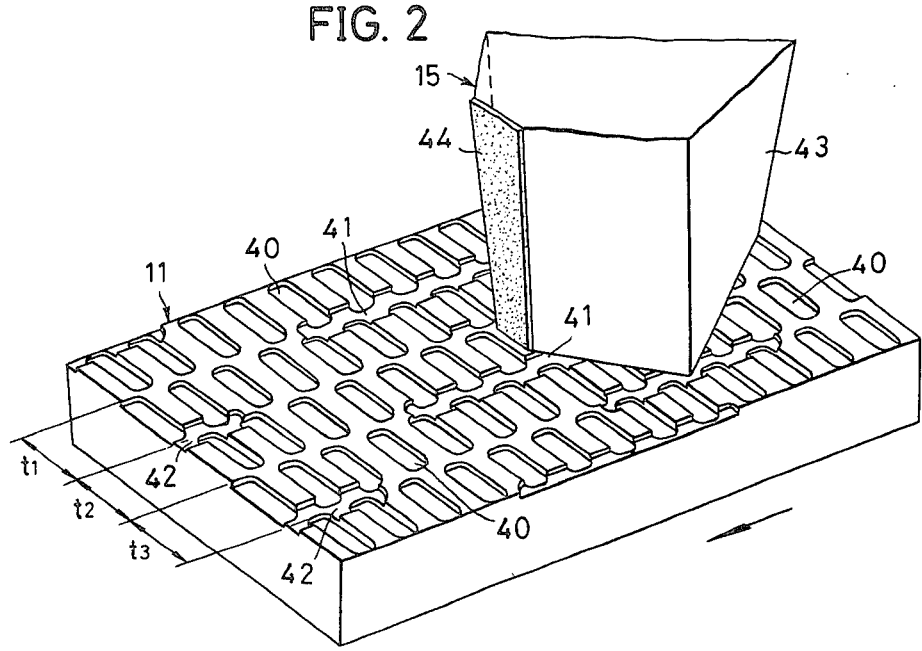
FIG. 2 is a perspective view in an enlarged scale, showing a part of a rotary recording medium together with a tip end part of a reproducing stylus.

A video signal is recorded on a spiral track with pits formed on the disc 11 according to the information contents of the signal. One part of this track is shown in an enlarged scale in FIG. 2. In FIG. 2, track turns of a single continuous spiral track, corresponding to each revolution of the disc 11, are designated by t1, t2, t3, .... Each track turn is constituted by the formation of pits 40 of a main information signal along a plane track path and has no stylus guide groove formed therein. With respect to one track turn t1, in every horizontal scanning period (H) at a position corresponding to the horizontal blanking period, pits 41 of a first reference signal fp1 are formed on one lateral side of the track as viewed in the track path direction. Pits 42 of a second reference signal fp2 are formed on the other side of the track.

At an intermediate position between the centerlines of adjacent track turns, only pits of either one kind of the pits 41 and 42 of the above reference signals fp1 and fp2 are formed, and moreover, with respect to one track, the sides on which the pits 41 and 42 are formed are alternated for every track turn. That is, if the pits 41 and 42 are respectively formed on the right and left sides of one track turn, for example, the pits 42 and 41 will respectively be formed on the right and left sides of each of the adjacent track turns.

The tip end of the reproducing stylus 15 has a shape shown in FIG. 2. The reproducing stylus 15 is constituted by a stylus structure 43 having a disc tracing surface which has a width greater than a track width, and an electrode 44 fixed to the rear face of the stylus structure 43. As the reproducing stylus 15 traces along a track on the disc 11 rotating in a direction indicated by an arrow, the video signal recorded thereon by the formation of pits is reproduced as variations in the electrostatic capacitance between the surface of the disc 11 and the electrode 44 of the reproducing stylus 15.

Figure 3:
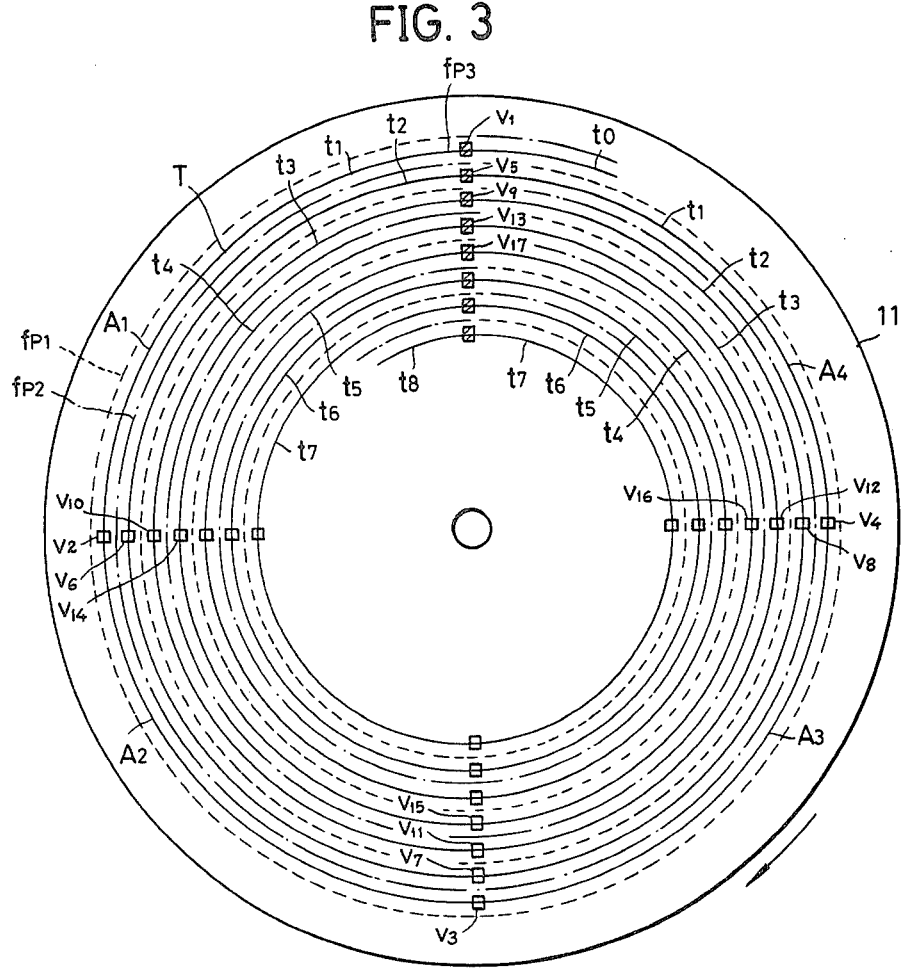
FIG. 3 shows track patterns of a rotary recording medium.

On the disc 11, as indicated in FIG. 3, a video signal is recorded along a spiral track T for two frames, that is, four fields, per one revolution of the disc. In FIG. 3, the tracks of the reference signal fp1 is shown by dotted lines while the reference signal fp2 is shown by one-dot chain lines. The positions of the vertical synchronizing signals of respective fields are designated by reference characters V1, V2, V3, ..., and the successive track parts corresponding to one revolution of the disc of a single spiral track T will respectively be designated by track turns t1, t2, t3, .... Furthermore a third reference signal fp3 is recorded at the starting end positions V1, V5, V9, ... of each of the track turns t1, t2, t3, ..., that is, at positions where the reference signals fp1 and fp2 change over. A video signal of four fields, namely A1, A2, A3, and A4, is recorded in each track.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16, is demodulated into the original video signal by a demodulator 17 and is obtained as an output through an output terminal 18.

The output signal of the preamplifier 16 is supplied to a lowpass filter 19 wherein the reference signals f1, fp2, and fp3 are separated. The output reference signals pass through an automatic gain control circuit 20, and are respectively supplied to amplifiers 21, 22, and 23. Here, each of the amplifiers 21, 22, and 23 is a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26.

The reference signal fp3 separated and amplified at this bandpass amplifier 23, is supplied to a switching signal generating circuit 27 and a synchronizing signal generating circuit 33 which will be described hereinafter.

The gate switching circuit 26 performs switching of the reference signals fp1 and fp2 every one revolution period of the disc 11 upon normal reproduction, in response to the switching signal generated by the switching signal generating circuit 27 which is applied thereto. Hence, due to the switching signal which reverses polarity every two frames (1/15 seconds), the signals fp1 and fp2 are always alternately supplied to detecting circuits 28 and 29 from the gate switching circuit 26.

The detecting circuits 28 and 29 detect the envelopes of their respective input reference signals, and convert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal passes through a phase compensation circuit 31 and is further amplified to a specific level by a driving amplifier 32.

The output signal of the driving amplifier 32 is applied to a coil of the signal pickup device 14 as a control signal, to control the signal pickup device 14. As a result, tracking control is performed with respect to the reproducing stylus 15 so that the above tracking error signal becomes zero, that is, so that the reproducing stylus 15 correctly traces over the track T of the disc 11.

Next, description will be given with respect to the operation upon quick-motion reproduction. The output reference signal fp3 of the amplifier 23 is supplied to the switching signal generating circuit 27 as described above, and also supplied to the synchronizing signal generating circuit 33. A synchronizing signal generating circuit of a known circuit construction can be used as the synchronizing signal generating circuit 33. For example, the synchronizing signal generating circuit 33 comprises a crystal oscillator for producing a signal having a frequency of 14.3 MHz, and a circuit for using the signal produced by the crystal oscillator as a clock signal to generating a horizontal synchronizing signal HS having a frequency of 15.7 kHz and a vertical synchronizing signal VS having a frequency of 60 Hz. In the present embodiment of the invention, the circuit within the synchronizing signal generating circuit 33 for generating the horizontal and vertical synchronizing signals HS and VS, is reset by the reference signal fp3 supplied from the amplifier 23.

The horizontal synchronizing signal HS generated by the synchronizing signal generating circuit 33 is supplied to a counter 34, and the vertical synchronizing signal VS is supplied to the counter 34 and a counter 35. The counter 34 is initially set when the first vertical synchronizing signal Vs is supplied thereto, and generates one pulse signal fI every time the counter 14 is supplied with fifteen horizontal synchronizing signals HS. After the counter 14 generates fifteen such pulse signals fI, the counter 14 generates the sixteenth pulse signal when supplied with the succeeding vertical synchronizing signal VS, and is accordingly reset. Thereafter, the counter 34 generates the pulse signal fI every time fifteen horizontal synchronizing signals VS are supplied to this counter 34, and repeats the above described operations. Accordingly, sixteen pulse signals fI are generated for an interval of one field of the video signal. Since a video signal of four fields is recorded each track turn of the disc 11, sixty-four pulse signals fI are generated for each track turn of the disc.

With respect to each field, an interval between the first and the fifteenth pulse signals fI corresponds to an interval of fifteen horizontal synchronizing signals. On the other hand an interval between the fifteenth and sixteenth pulse signals fI corresponds to an interval of thirty-seven or thirty-eight horizontal synchronizing signals, since the following equation stands.

(525/2) − 15 × 15 = 37.5

The interval between the fifteenth and sixteenth pulse signals fI (37HS or 38HS) is longer than the interval between other pulse signals fI (15HS), because the address signal is recorded at a position of the disc 11 corresponding to a part of this interval, and since it is desirable to shift the reproducing stylus avoiding this address signal.

The counter 35 is supplied with the vertical synchronizing signal VS from the synchronizing signal generating circuit 33, and is accordingly reset to zero. The counter 35 counts up every time the pulse signal fI from the counter 34 is supplied thereto. When the sixteenth pulse signal fI is supplied to the counter 35, the counter 35 is again reset to zero by the vertical synchronizing signal VS which is simultaneously supplied with the sixteenth pulse signal fI. An output counted signal of the counter 35 is supplied to a decoder 36.

The decoder 36 is applied with a signal which is in accordance with the speed (multiplication number) of the quick-motion reproduction, through a terminal 37, and is set according to the multiplicity number. For example, the decoder 36 generates a kick pulse control signal during an interval wherein the contents of the counted output of the counter 35 are the fourteenth to the sixteenth pulse signals fI in one field and the first and second pulse signals fI in a succeeding field. An output kick pulse control signal of the decoder 36 is supplied to a kick pulse generator 38.

When the kick pulse control signal from the decoder 36 is supplied to the kick pulse generator 38, the kick pulse generator 38 generates a kick pulse having a period of 300 μsec. The kick pulse thus generated is applied to a tracking coil of the signal pickup device 14, through the driving amplifier 32, to shift the reproducing stylus 15 to an adjacent track. In addition, the generated kick pulse is also supplied to the switching signal generating circuit 27, to reverse the polarity of the switching signal.

Figure 4:
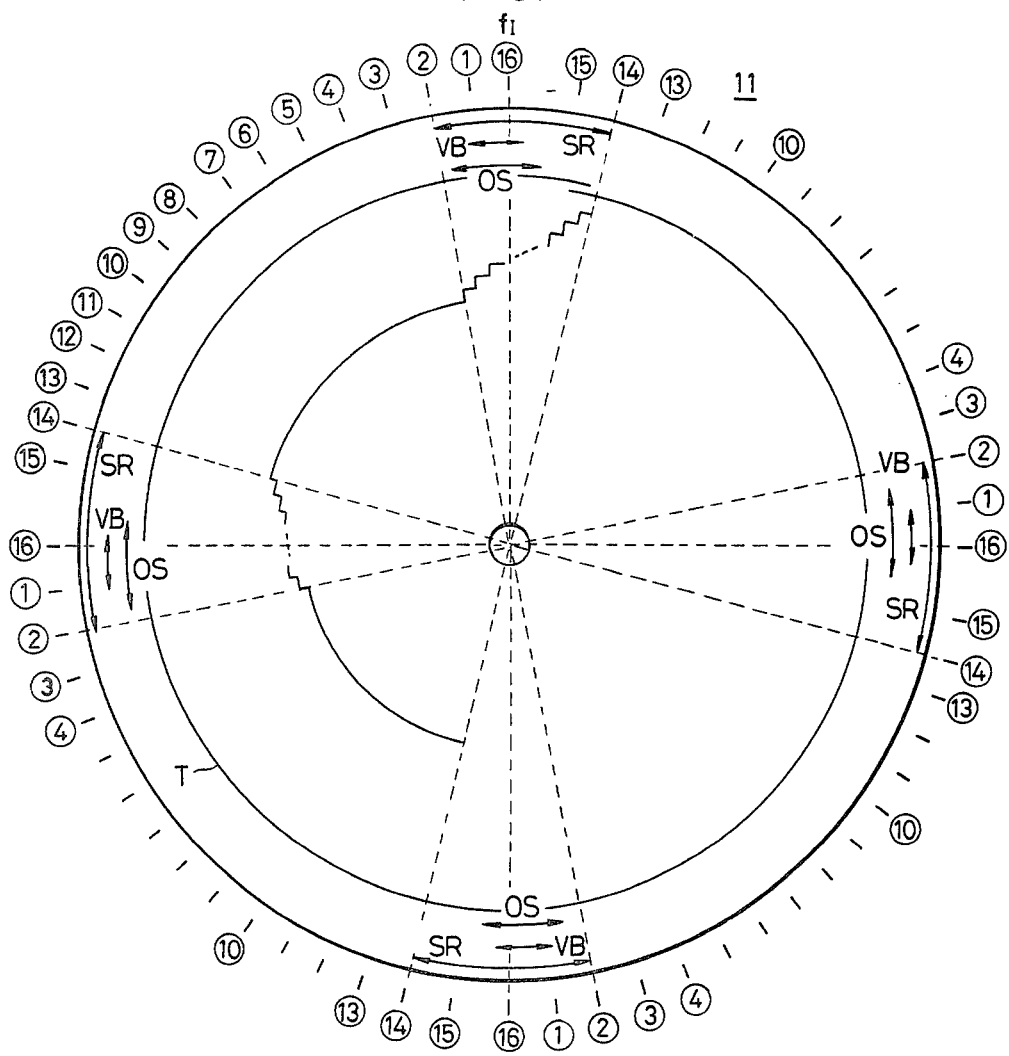
FIG. 4 is a diagram for explaining a range in which the reproducing stylus is shifted to an adjacent track, according to the quick-motion reproducing system of the present invention.

A range (region) in which the reproducing stylus 15 is kicked on the disc 11, is shown in FIG. 4. In the present embodiment of the invention, the kicking operation is performed within an interval corresponding to the fourteenth to sixteenth pulse signals fI of one field and the first and second pulse signals fI of the succeeding field, as already described above. In FIG. 4, the numbers indicated at the outer periphery of the disc 11 indicates the order with which the pulse signal fI is generated, and indicates the relationship between the generation point of the pulse signal fI and the angular position on the disc 11.

An interval between adjacent pulse signals is 1 msec, while the period of the kick pulse is 300 μsec. Thus, with respect to one pulse signal which is generated, the kick pulse is generated three times, and the reproducing stylus 15 can be shifted three times. Accordingly, between an interval between the fourteenth pulse signal fI of one field and the second pulse signal fI of the succeeding field, the reproducing stylus 15 may be shifted twelve (3 × 4 = 12) times. A range SR in which the reproducing stylus 15 can be shifted, exists at four positions within one track turn. Therefore, the reproducing stylus can be shifted fourty-eight times within one track turn, and a 49-times speed quick-motion reproduction can be performed in this case.

The vertical synchronizing signals (V1, V2, V3 . . . ) indicated in FIG. 3 are recorded at the position of the sixteenth pulse signal fI. A range (region) indicated by VB in FIG. 4 is the range of the vertical blanking period. The vertical blanking periods do not appear in the picture of the television receiver. Moreover, generally, there are the so-called over-scanning parts which are scanned but do not appear in the effective picture screen in the television receiver. In FIG. 4, a range (region) indicated by OS includes the vertical blanking period and the over-scanning period.

Accordingly, within the range OS, the noise introduced as the reproducing stylus 15 is shifted, does not appear at all in the effective picture in the television receiver. On the other hand, within the range SR, the noise introduced as the reproducing stylus 15 is shifted within the range excluding the range OS, appears in the effective picture in the television receiver. However, this noise appears at positions corresponding to the upper end and lower end parts of the effective picture, and the noise does not appear at all at the central part of the picture which forms the most essential part of the effective picture. Hence, even when noise is introduced, the noise appears at the upper and lower end parts of the effective picture where the noise does not stand out. As a result, degradation is not introduced in the quality of the reproduced picture even with the introduced noise.

The shifting range SR is not limited to that described in the above embodiment of the invention. For a quick-motion reproduction slower than the 49-times speed quick-motion reproduction, the shifting range SR can be set to a range narrower than in the above embodiment. On the other hand, for a quick-motion reproduction faster than the 49-times speed quick-motion reproduction, the shifting range SR can be set to a range wider than in the above described embodiment. In a case where the multiplicity number of the quick-motion reproduction and the shifting range are respectively set to large values, the noise appearing in the effective picture increases. However, even in this case, the noise appears at the upper and lower end parts of the effective picture, and does not appear at the central part of the picture. Therefore, the degree of degradation introduced in the quality of the reproduced picture due to the noise is small.

Figure 5:
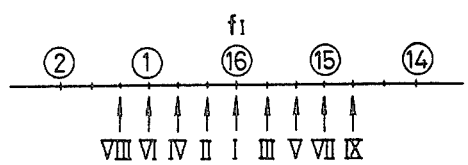
FIG. 5 shows a limit in range in which the reproducing stylus can be shifted according to the speed of the quick-motion reproduction, within one shifting range of the reproducing stylus.

As an alternative, as shown in FIG. 5, the shifting range SR of the reproducing stylus may be successively widenned from the center of the shifting range, according to the quick-motion multiplicity number indicated by the signal supplied to the decoder 36 from the terminal 37. In FIG. 5, reference characters I, II, III, IV, . . . indicate the order with which the range limits of the shifting range SR are widenned according to the multiplicity number.

The present invention is not limited to the above described embodiment, that is, not limited to the application with respect to the electrostatic capacitance type reproducing appratuses, and can also be applied to optical type reproducing apparatuses.

Further, the present invention is not limited to these embodiments, but various variations and modifications may be made without departing from the scope of the present invention.

What is claimed is:

1. A quick-motion system for reproducing a rotary recording medium by use of a reproducing element, said rotary recording medium having a video signal recorded on a spiral track and further having a predetermined reference signal recorded on said spiral track, said predetermined reference signal being recorded within intervals corresponding to vertical synchronizing signals within vertical blanking periods of said recorded video signal for each track turn of said spiral track, said quick-motion reproducing system comprising:

kick pulse generating means for generating a plurality of kick pulses only within a predetermined shifting interval consisting of the vertical blanking period of said recorded video signal and intervals immediately prior to and after this vertical blanking period; and shifting means responsive to said kick pulse generating means for stepwisely shifting said reproducing element to a track in accordance with said plurality of kick pulses only within said predetermined shifting interval.

2. A quick-motion reproducing system as claimed in claim 1 in which said predetermined shifting interval includes said vertical blanking period, and an over-scan period and periods in the vicinity of this over-scan period of a television receiver which is supplied with a reproduced video signal from said reproducing apparatus.

3. A quick-motion reproducing system as claimed in claim 1 in which said predetermined shifting interval is an interval extending to four divided intervals on both sides with respect to a center of said vertical synchronizing signal position, in units of divided intervals obtained by dividing one field interval of said video signal into sixteen intervals.

4. A quick-motion reproducing system as claimed in claim 3 in which said kick pulse generating means generates the kick pulse so as to shift said reproducing element three times within said one divided interval.

5. A quick-motion system for reproducing a rotary recording medium by use of a reproducing element, said rotary recording medium having a video signal recorded on a spiral track and further having a predetermined reference signal recorded on said spiral track, said predetermined reference signal being recorded within intervals corresponding to vertical synchronizing signals within vertical blanking periods of said recorded video signal for each track turn of said spiral track, said quick-motion system comprising:

kick pulse generating means for generating a kick pulse only within a predetermined shifting interval including the vertical blanking period of said recorded video signal and intervals in the vicinity of this vertical blanking period; and shifting means responsive to said generated kick pulse for successively shifting said reproducing element to adjacent tracks only within said predetermined shifting interval, said kick pulse generating means comprising:

synchronizing signal generator means for generating a horizontal synchronizing signal and a vertical synchronizing signal according to the reproduced predetermined reference signal;

first counter means responsive to said horizontal synchronizing signal and said vertical synchronizing signal generated by said synchronizing signal generator means for producing a pulse signal every time a predetermined number of said horizontal synchronizing signal is counted, said first counter means being reset by said vertical synchronizing signal;

second counter means responsive to an output pulse signal of said first counter means and the output vertical synchronizing signal of said synchronizing signal generator means for counting said pulse signal after said vertical synchronizing signal is supplied to said second counter means;

decoder means responsive to a counted output of said second counter means for generating a kick pulse control signal within an interval between two pulse signals of predetermined order; and kick pulse generator means responsive to said kick pulse control signal for generating said kick pulse.

6. A quick-motion reproducing system as claimed in claim 5 in which said decoder is applied with a signal which is in accordance with a multiplicity number of the quick-motion reproduction, and generates said kick pulse control signal within an interval range which is in accordance with said multiplicity number.

* * * * *